(12) United States Patent
Nikkhoo (10) Patent No.: US 8,800,846 B2
(45) Date of Patent: Aug. 12, 2014

(54) ULTRASONIC BONDING

(71) Applicant: Apple Inc., Cupertino, CA (US)

(72) Inventor: Michael Nikkhoo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 13/752,263

(22) Filed: Jan. 28, 2013

(65) Prior Publication Data

US 2013/0193193 A1    Aug. 1, 2013

Related U.S. Application Data

(60) Provisional application No. 61/591,742, filed on Jan. 27, 2012, provisional application No. 61/608,036, filed on Mar. 7, 2012, provisional application No. 61/610,402, filed on Mar. 13, 2012, provisional application No. 61/611,763, filed on Mar. 16, 2012, provisional application No. 61/616,164, filed on Mar. 27, 2012.

(51) Int. Cl.
*B23K 1/06* (2006.01)

(52) U.S. Cl.
USPC .................... 228/110.1; 228/180.5

(58) Field of Classification Search
None
See application file for complete search history.

(56) References Cited

U.S. PATENT DOCUMENTS

| | | | | |
|---|---|---|---|---|
| 3,440,118 A | * | 4/1969 | Obeda | 156/73.2 |
| 4,933,305 A | * | 6/1990 | Kikkawa | 438/120 |
| 5,003,373 A | * | 3/1991 | Tsumura et al. | 257/771 |
| 5,147,082 A | * | 9/1992 | Krause et al. | 228/1.1 |
| 5,379,512 A | | 1/1995 | Ingle et al. | |
| 5,493,069 A | * | 2/1996 | Conti | 174/94 R |
| 5,578,888 A | * | 11/1996 | Safabakhsh | 310/328 |
| 5,584,122 A | * | 12/1996 | Kato et al. | 29/872 |
| 5,620,555 A | * | 4/1997 | Choudhury | 156/580.2 |
| 5,816,472 A | * | 10/1998 | Linn | 228/1.1 |
| 5,836,071 A | | 11/1998 | Falcone et al. | |
| 5,884,835 A | * | 3/1999 | Kajiwara et al. | 228/110.1 |
| 5,954,549 A | * | 9/1999 | Shinchi | 439/874 |
| 6,105,848 A | * | 8/2000 | Horibe et al. | 228/110.1 |
| 6,213,378 B1 | * | 4/2001 | Singh | 228/110.1 |
| 6,523,723 B1 | * | 2/2003 | Ekstrom | 222/165 |
| 6,593,222 B2 | * | 7/2003 | Smoak | 438/615 |
| 6,638,384 B1 | * | 10/2003 | Edwards et al. | 156/173 |
| 6,824,630 B2 | * | 11/2004 | Oishi et al. | 156/73.1 |

(Continued)

FOREIGN PATENT DOCUMENTS

| | | | |
|---|---|---|---|
| JP | 03-254078 A | * | 11/1991 |
| JP | 2005-340107 A | * | 12/2005 |
| JP | 2007-067342 A | * | 3/2007 |

OTHER PUBLICATIONS machine translation of JP-2007-067342A (no date available).*

*Primary Examiner* — Kiley Stoner
(74) *Attorney, Agent, or Firm* — Womble Carlyle Sandridge & Rice LLP (57) ABSTRACT

The described embodiment relates generally to the field of ultrasonic bonding. More specifically, an apparatus for bonding a number of wires directly to a metal substrate in a single operation without the use of any kind of adhesive or solder is disclosed. The apparatus is an ultrasonic bonder. The ultrasonic bonder has a horn with a cavity specifically sized for the number of wires to be bonded. The ultrasonic bonder is driven at a frequency that corresponds to a resonant frequency of the wires to be bonded.

17 Claims, 7 Drawing Sheets

(56) References Cited

U.S. PATENT DOCUMENTS

| | | | |
|---|---|---|---|
| 6,967,287 B2 * | 11/2005 | Ide et al. | 174/84 R |
| 7,629,688 B2 * | 12/2009 | Minamio et al. | 257/738 |
| 2004/0088857 A1 * | 5/2004 | Fujimoto et al. | 29/871 |
| 2006/0196915 A1 * | 9/2006 | Gunnerman | 228/110.1 |
| 2006/0255091 A1 * | 11/2006 | Reatherford et al. | 228/1.1 |
| 2008/0169714 A1 * | 7/2008 | Kataoka et al. | 310/71 |
| 2011/0042444 A1 * | 2/2011 | Ohnuma | 228/110.1 |
| 2011/0062218 A1 * | 3/2011 | Ohnuma | 228/110.1 |
| 2012/0153006 A1 * | 6/2012 | Koetting et al. | 228/102 |
| 2012/0298645 A1 * | 11/2012 | Kleespiess et al. | 219/137 R |

* cited by examiner

ULTRASONIC BONDING

CROSS-REFERENCE TO RELATED APPLICATIONS

This patent application is related to and incorporates by reference in their entireties for all purposes the following provisional patent applications:
(i) U.S. Provisional Application Ser. No. 61/591,742 (P13099USP1) entitled "ULTRASONIC BONDING" by Nikkhoo, filed Jan. 27, 2012;
(ii) U.S. Provisional Application Ser. No. 61/608,036 (P13098USP2) entitled "INDUCTION BONDING" by Nikkhoo et al., filed Mar. 7, 2012;
(iii) U.S. Provisional Application Ser. No. 61/610,402 (P13098USP3) entitled "INDUCTION BONDING" by Nikkhoo et al., filed Mar. 13, 2012;
(iv) U.S. Provisional Application Ser. No. 61/611,763 (P13098USP4) entitled "INDUCTION BONDING" by Nikkhoo et al., filed Mar. 16, 2012; and
(v) U.S. Provisional Application Ser. No. 61/616,164 (P13098USP5) entitled "INDUCTION BONDING" by Nikkhoo et al., filed Mar. 27, 2012.

BACKGROUND

1. Technical Field

The described embodiment relates generally to the use of an ultrasonic welding machine in electronics manufacturing.

2. Related Art

One common way to affix wires to a printed circuit board (PCB) is with a hot press. Wires are laid on top of a PCB pad with a certain amount of solid adhesive applied on the PCB pad. A pneumatic arm presses a heated pad down on to the wires and adhesive, melting the adhesive and embedding the wires within the adhesive. Unfortunately, to accomplish this with a high degree of reliability, the mechanical tolerances on the hot press must be quite precise. Both the distance the arm brings the heated pad down, and the pressure with which it pushes the wire into the adhesive, must be quite accurate. Consequences of inaccuracies can include improper adhesion of the wires, adhesive splash on neighboring components and even cracking or breaking of the PCB in extreme cases. The cost of precision machinery capable of delivering the requisite tolerances needed to make this manufacturing technique reliable is quite high. Even when adhesion is achieved, the melting process involved with the hot press process results in a phenomenon known in the industry as electromigration. When the bonding agent is heated small portions of it actually vaporize and are deposited across the area of the PCB itself. Electromigration can cause any number of undesirable consequences, such as for example, corrosion of electrical components and even short-circuiting.

Therefore, what is desired is a manufacturing tool capable of adhering the wires to the PCB pad in a reliable, repeatable way at a lower overall cost, without the need for volatile adhesives.

SUMMARY

This paper describes various embodiments that relate to an apparatus and method for bonding a plurality of individual ends of a stranded wire to a printed circuit board.

In a first embodiment, an apparatus for ultrasonically bonding a number of wires to a printed circuit board (PCB) pad is disclosed. The apparatus includes at least the following elements: (1) an ultrasonic vibration driver configured to create mechanical vibrations only between 60 and 80 kHz; and (2) a steel ultrasonic bonding horn with a cavity shaped to maximize the amount of ultrasonic energy imparted to the plurality of wires. The ultrasonic vibrations made by the apparatus cause the plurality of wires to vibrate harmonically, and the bonding operation itself takes place over a period of between 50 and 100 milliseconds.

In another embodiment, a method for bonding a number of wires to a printed circuit board (PCB) pad without solder is disclosed. The method includes at least the following steps: (1) bundling a plurality of wires together on a PCB pad; (2) placing a cavity of an ultrasonic bonding horn over the plurality of bundled wires; and (3) actuating the ultrasonic bonding horn at a frequency of between about 60 and 80 kHz for a period of between about 50 and 100 milliseconds. The single actuation of the ultrasonic bonding horn causes a metal-to-metal bond to be formed between each of the plurality of wires and the PCB pad.

In yet another embodiment, a non-transient computer readable medium is disclosed. The non-transient computer readable medium is for storing computer code executable by a processor in a computer aided manufacturing system for bonding a number of wires to a metal substrate without solder. The non-transient computer readable medium comprises at least the following: (1) computer code for placing the wires together on the PCB pad; (2) computer code for placing a cavity of an ultrasonic bonding horn over the wires; and (3) computer code for actuating the ultrasonic bonding horn at a frequency of between about 60 and 80 kHz for a period of between about 50 and 100 milliseconds. The single actuation of the ultrasonic bonding horn causes a metal-to-metal bond to be formed between each of the plurality of wires and the metal substrate.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF EXAMPLE EMBODIMENTS

A representative application of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Surface mounting techniques often involve the use of printed circuit board (PCB) pads to assist in mounting components to the surface of a PCB. Surface mounting techniques have advantages when compared with through-hole attachment techniques. In particular, using a PCB pad allows the number of holes in a PCB to be minimized, reducing the cost of the PCB and making it easier to run electrical traces throughout the board. In smaller scale manufacturing operations, electrical leads can be simply soldered to the top of the PCB pad by heating up the PCB with a soldering iron and then slowly applying solder to the surface of the PCB pad which melts the solder, thereby adhering the solder to the wire leads. In large scale manufacturing operations it simply isn't feasible to manually solder wires onto a PCB pad. One way to adapt this process to mass production is to use a hot press to accomplish the same end state. A hot press can be used that includes a mechanical arm to press a heated bar into a pre-placed set of wire leads and solder paste arranged on top of a PCB pad. By exerting a proper amount of pressure for a sufficiently long period of time at a proper temperature, a strong reliable connection can be made between the lead wires and the PCB pad. Unfortunately, the tolerances in complex electronic configurations can be quite high. While applying a hot press to a few wires may not sound complex, inconsistencies in pressure, heat, or even position can result in faulty connections and unusable end products. Manufacturing machines that do have the proper tolerances necessary to achieve consistent results can be prohibitively expensive.

Another disadvantage of using an adhesive to attach individual ends of a stranded wire to a PCB pad is that heating the adhesive can result in a phenomenon known as electromigration. When the adhesive is heated, small amounts are vaporized and then resettle on neighboring surfaces. When that neighboring surface is a PCB with a large number of electrical components mounted on it, electromigration can cause problems. One significant problem with electromigration is that the electromigrated adhesives tend to encourage corrosion when layered on top of other electronic surfaces. Even a layer as thin as 3-4 microns can cause premature failure of components. Therefore, a solution that minimizes or does away with the use of adhesives is highly desirable.

One way to overcome the fine control problems and electromigration problems of a hot press configuration is to design a configuration in which no actual mechanical contact is required and the attachment occurs without the use of adhesives. Ultrasonic welding is one process which can be carried out without contact between the bonder and the PCB pad. Ultrasonic frequencies are vibrations that occur above a frequency level discernable by the human ear. This frequency range is regarded as being any frequency greater than 20 kHz. Ultrasonic welders vibrate at an ultrasonic frequency that causes resonation in wires of a particular thickness. Generally, the frequency of the ultrasonic welders increases as the diameter of the wires to be bonded gets smaller. An ultrasonic welder configured to weld a single wire generally contains a cavity, which fits above a wire arranged on the surface to be welded. When the ultrasonic welder is activated the wire quickly bonds to the substrate. The resulting attachment can be both electrically and mechanically superior to bonds created in soldering operations. These ultrasonic mechanical vibrations applied have been shown to be capable of cold fusing metal wires to a metal substrate, even where the metals have different material properties. By making a direct metal-to-metal connection between the wire and the metal substrate, an entire layer of resistance is removed, and any possibility of weakening of a solder joint is also eliminated. Unfortunately, this process has been limited to single-wire configurations. The design of multi-wire systems has been generally regarded as unachievable. One reason for this difficulty is that when stranded wires are attached to a PCB pad the ultrasonic vibrations from the ultrasonic welding tool tend to vibrate the PCB pad in addition to the targeted stranded wires. Since PCB pads are normally fixed to a PCB with adhesive it doesn't take much vibration to rip the PCB pad right off the PCB. Therefore, a solution that can accomplish the bonding of a number of wires in a short period of time would be helpful in both increasing workflow efficiency and maintaining the integrity of the underlying PCB pads.

These and other embodiments are discussed below with reference to FIGS. 1-6; however, those skilled in the art will readily appreciate that the detailed description given herein with respect to these figures is for explanatory purposes only and should not be construed as limiting.

Figure 1:
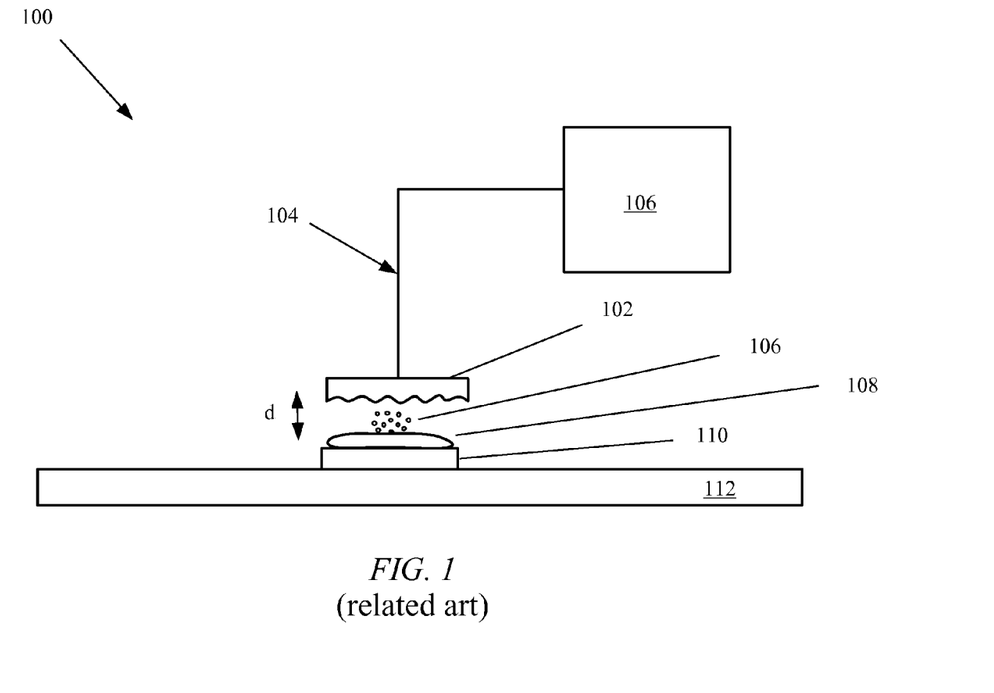
FIG. 1 illustrates a hot press that can be found in a conventional manufacturing line.

FIG. 1 illustrates a hot press that can be found in a conventional manufacturing line. A hot press includes hot bar 102 which can be mechanically and electrically attached to a hydraulic arm 104. The whole device can be powered and controlled by controller 106. Controller 106 is responsible for pressing hot bar 102 into stranded wire 106 and solder paste 108. Controller 106 can apply energy to hot bar 102 in order to heat it to a predetermined temperature. This can be achieved in a number of ways such as, for example, with electrical resistance heating, or even with a steam heated conduit. Once hot bar is heated to the predetermined temperature, hydraulic arm 104 can apply pressure to stranded wires 106 and solder paste 108. Copper PCB pad 110 provides a steady base for hydraulic arm 104 to push against and also facilitates even heating. When hydraulic arm 104 presses down too quickly or with too much force, the connections can be compromised. By moving hot bar 102 down too quickly, solder paste 108 can actually splash off copper PCB pad 110 and onto PCB 112, potentially adversely affecting other components. When hot bar 102 is applied with too much force, stranded wire 106 could be uncovered as too much of solder paste 108 is pushed aside. If too little force is applied, then stranded wire 106 might not be pushed far enough into solder paste 108. As explained, contact between hot bar 102 and the electrical components can have a number of undesirable consequences.

Figure 2A:
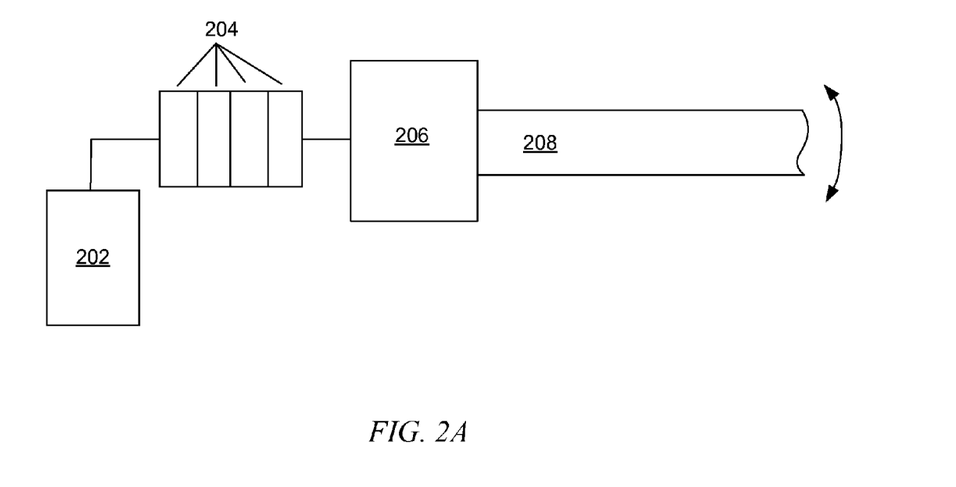
FIGS. 2A-2B show the basic building blocks of a single wire ultrasonic bonding machine.
Figure 2B:
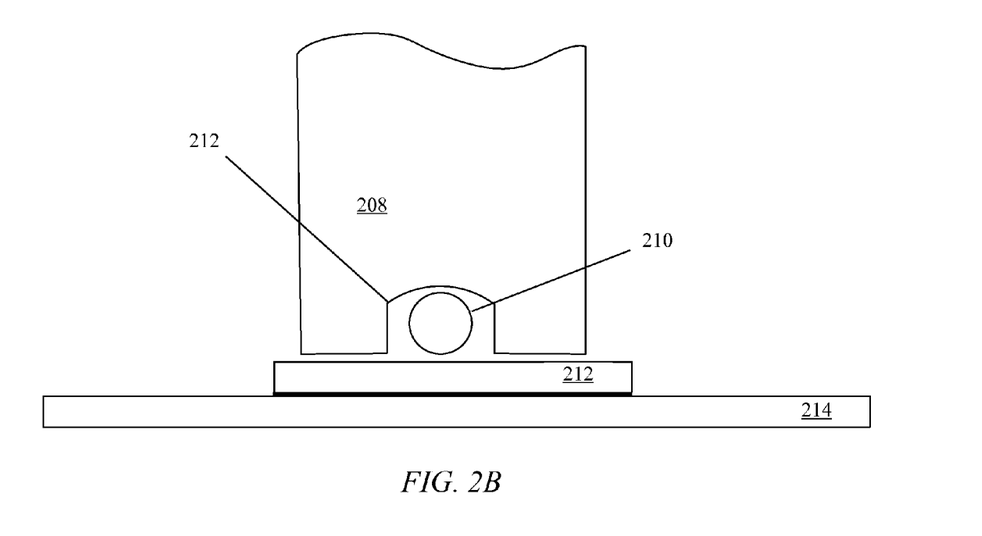

FIGS. 2A-2B shows how an ultrasonic actuator is typically constructed. In FIG. 2A, voltage source 202 is connected to a series of piezoelectric actuators 204 which vibrate at ultrasonic frequencies when powered. Since the amplitude of piezoelectric actuators 204 are quite small, an amplification system 206 is used to increase the strength of the piezoelectric vibrations. Finally, the amplifier is mechanically coupled to an ultrasonic horn that further strengthens the amplitude of the vibrations sufficiently to complete an ultrasonic bonding operation. The ultrasonic horn is generally made of precisionmachined tool steel, although other sufficiently rigid and robust materials could also be used. In FIG. 2B, a single wire ultrasonic bonding operation is illustrated. Since only single wire 210 is targeted, cavity 212 can be sized to conform precisely to the wire's shape, and effectively target single wire 210.

Figure 3A:
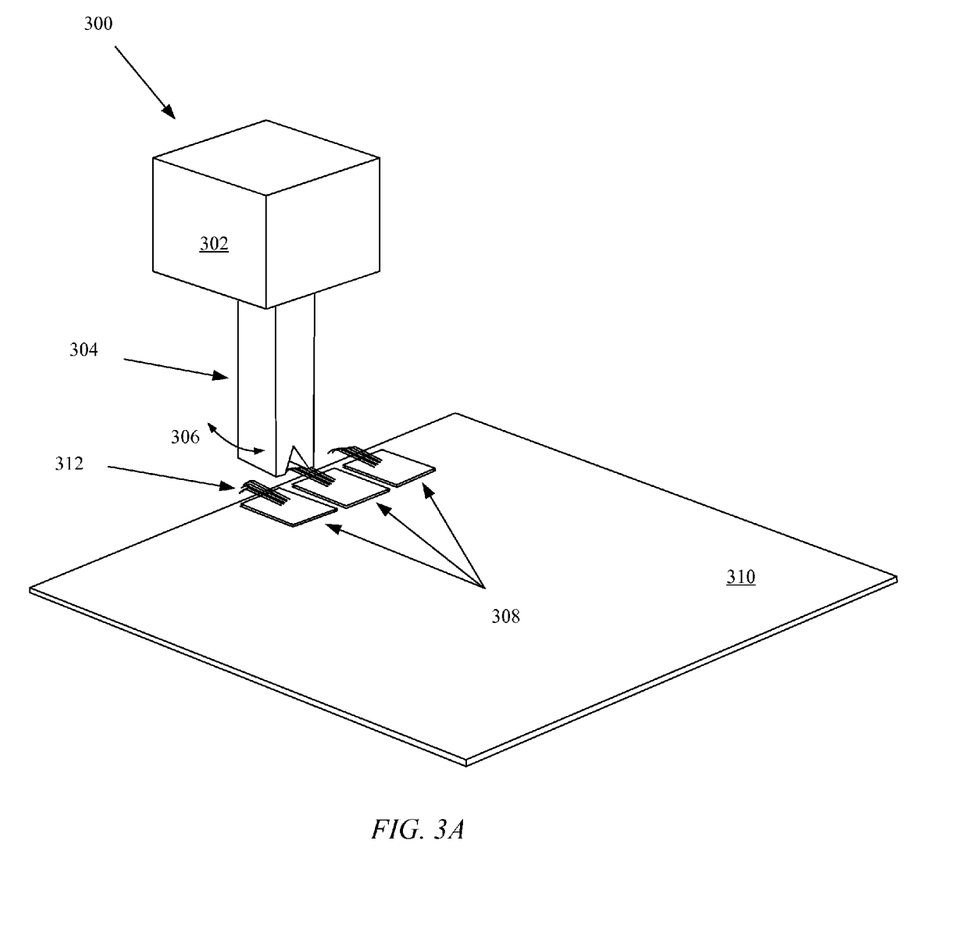
FIG. 3A shows a perspective view of an ultrasonic welder in accordance with the described embodiments.

FIG. 3A shows a perspective view of one possible configuration of ultrasonic bonder 300. Ultrasonic bonder 300 includes a driver portion 302 mechanically coupled to ultrasonic bonder horn 304. Ultrasonic bonder horn 204 takes an ultrasonic vibration input from driver portion 302, which is then amplified as it resonates down the length of the ultrasonic bonder horn 304. The vibratory motion of ultrasonic bonder horn 304 takes place along vibratory axis 306. Vibratory axis 306 can be aligned with a long dimension of PCB pad 308 as depicted. This alignment with the long dimension allows the greatest width of an adhesive layer bonding each of PCB pads 308 to PCB 310 to be maximized, thereby reducing the possibility of separation between PCB pad 308 and PCB 310 during an ultrasonic bonding operation. While the figure shows ultrasonic bonder horn 304 positioned next to PCB pads 308, the horn would be positioned directly over each PCB pad during an ultrasonic bonding operation. Advantageously, with this particular embodiment, bonding times are significantly faster than those achieved with other techniques. Stranded wires 312 can bond to PCB pad 308 after only between 50 and 100 milliseconds of applied ultrasonic vibrations. This bonding speed is about 2 figures of magnitude faster than a bonding speed achievable by the aforementioned hot press technique. Since there is no need to wait for any adhesive to cool and bonding times are much shorter, this configuration allows for significant time savings in manufacturing lines.

Figure 3B:
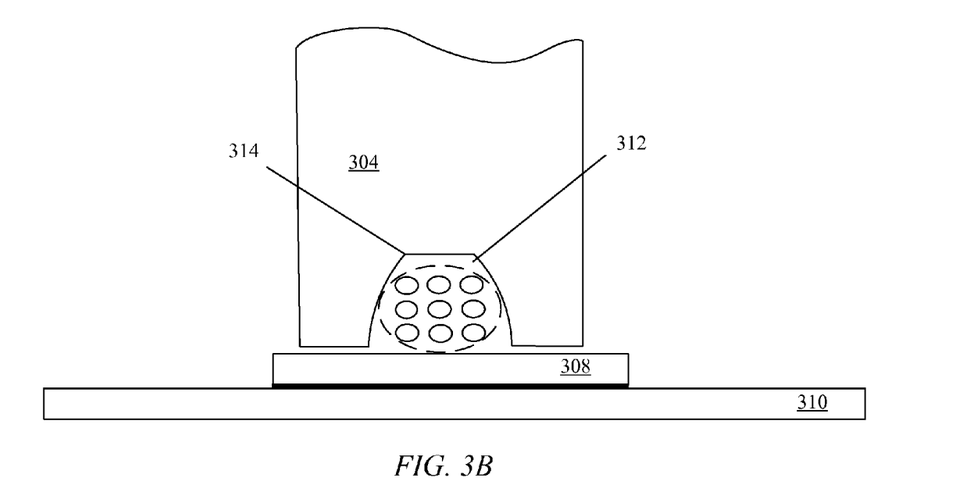
FIGS. 3B-3C shows the ultrasonic bonding horn just before and during the ultrasonic bonding operation.
Figure 3C:
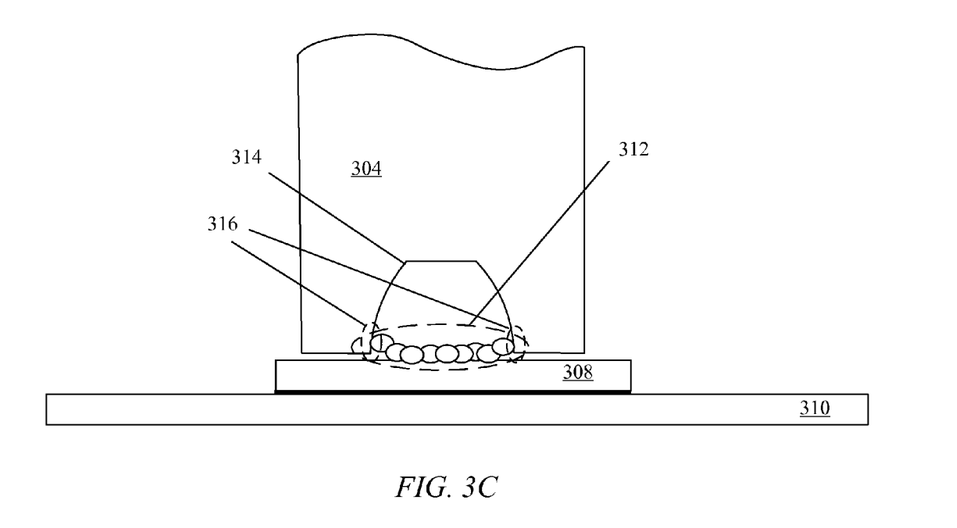

FIGS. 3B-3C show close up cross sectional views of the ultrasonic bonder horn 304 as it embeds stranded wire 312 into PCB pad 308 of PCB 310. Ultrasonic bonder horn 304 has cavity 314 that accommodates stranded wire 312 prior to the bonding operation. Once the ultrasonic vibrations begin, the walls of cavity 314 induce stranded wire 312 to bond to PCB pad 308. The geometry of cavity 314 will depend upon the size and number of wires to be bonded. A stranded wire having nine individual wire ends of diameter equal to about 10 microns was successfully bonded to a PCB pad in preliminary trials without adversely affecting the underlying PCB pad. By running a number of modeling and simulation tests, a proper cavity geometry can be selected for each manufacturing line that can induce each of the wires to form a metal-to-metal bond with the PCB pad in an efficient, repeatable manner. In the figure a curved somewhat wedge-shaped cavity 314 is shown; however, the shape and size can vary widely depending upon the number and size of the wires to be bound. For example, a purely conical or wedge shaped cavity geometry are definitely possible. Tightly bundling individual ends of stranded wire 312 and using a conformal cavity 314 can help to increase the speed at which this operation can take place, since a conformally-shaped cavity minimizes the number of directions the individual wire ends can travel in once the ultrasonic vibrations are applied.

FIG. 3C is an illustration showing wire positions at the middle of a bonding operation in which a majority of the wires have already been bonded to the PCB pad. In cases like this where outlying wires take longer to bond, microscopic roughing can be applied to cavity surfaces 316. Microscopic roughing on surface portions 316 can help speed up the bonding process by applying additional force to outbound individual ends of stranded wire 312 that have yet to bond. This roughing can allow each individual end of stranded wire 312 to successfully bond to PCB pad 308. It should be noted that while an exemplary wire 312 having nine individual ends is shown, this should not be construed as limiting as any number of wires can be used provided that cavity 314 is accordingly sized. For example, a stranded wire having seven individual ends with a diameter as small as seven microns can be bonded to a PCB pad by the disclosed process.

Figure 4:
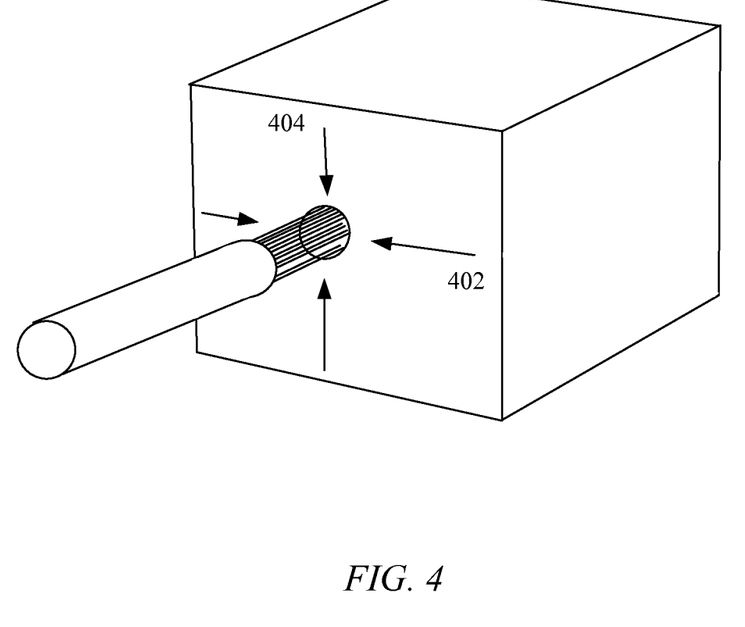
FIG. 4 shows an apparatus for joining individual ends of a wire together.

FIG. 4 shows one way to avoid the complexities involved with multi-wire ultrasonic bonding. Prior to conducting a bonding operation, individual ends of a stranded wire can be physically squeezed together by way of a tool called a swager. One embodiment of a swager is depicted in FIG. 4. Horizontal forces 402 and vertical forces 404 can be applied to the individual wire ends, resulting in a single amalgam of the previously individual wire strands. An ultrasonic bonder having a size, shape, and frequency in accordance with the unified wire can be used to bond the unified wire to a PCB pad. Yet another method that requires less mechanical force and potential for physical damage to the exposed wires is arc welding the wires together prior to an ultrasonic bonding operation.

Figure 5:
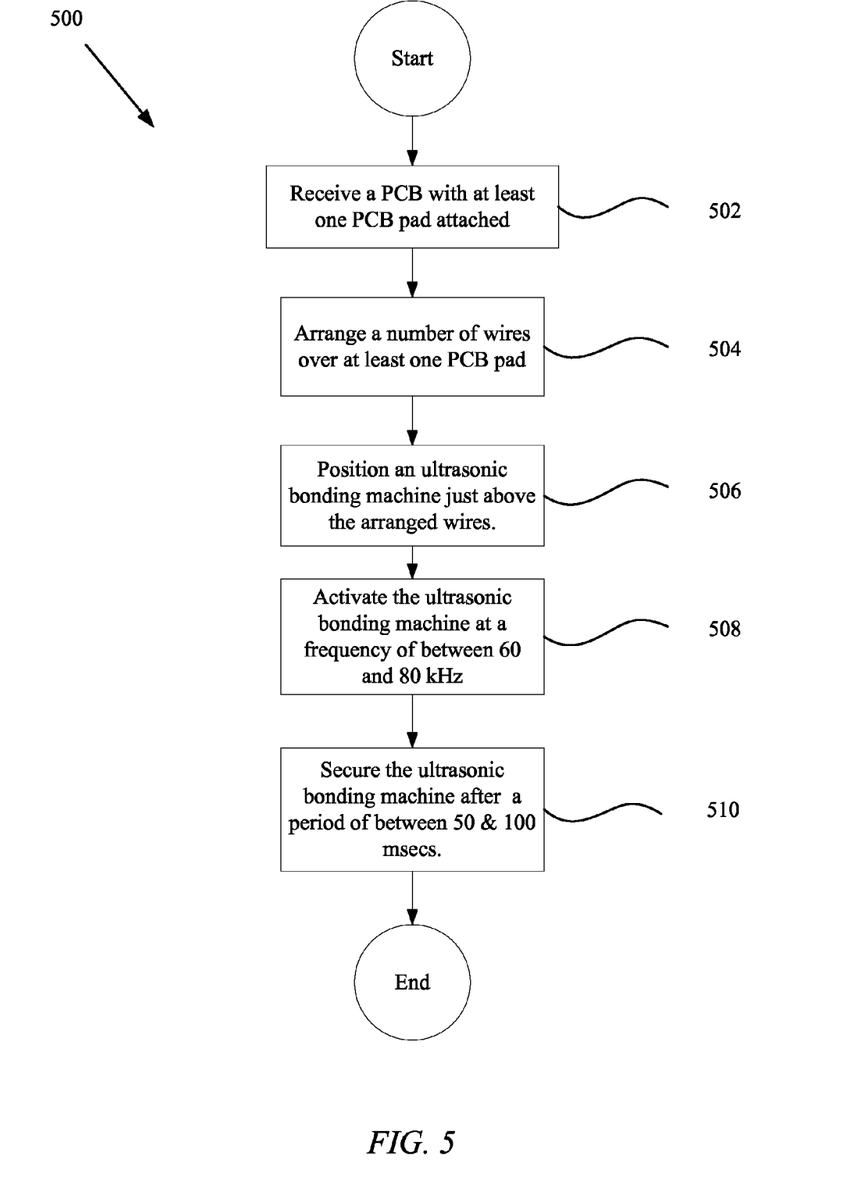
FIG. 5 shows a block diagram representing a process for attaching a number of wires to a printed circuit board.

FIG. 5 shows steps in a representative embodiment for a method 400 of ultrasonically bonding a number of wires to a PCB. In a first step 502, a PCB is received with at least one PCB attached to it. Generally, the PCB pad can be located at one end of the PCB. The PCB pad itself is attached to the PCB board with an adhesive layer. In a second step 504, a number of wires are arranged on the surface of the PCB pad. The wires should be closely spaced together on the PCB pad. In one embodiment, the number of wires can be about 10 microns in thickness each. In step 506, an ultrasonic bonding machine is placed just above the ends of the number of wires arranged on top of the PCB pad. The ultrasonic bonding machine propagates ultrasonic vibrations from a driver portion of the ultrasonic bonding machine through a component commonly referred to as a horn. The horn itself includes a small cavity which is positioned above and around the number of wires. In step 508, the ultrasonic bonding machine is activated. As the ultrasonic bonding machine is activated the vibrations propagating through the ultrasonic bonding horn increase rapidly to a steady state of between 60 kHz and 80 kHz. While the frequency achieved is quite high, the actual displacement of the ultrasonic bonding horn is just enough to excite the number of wires without damaging the underlying PCB pad. In one embodiment, the displacement of the bonding horn can be equal to about 10 microns. It is also important to note that it is important to avoid resonant frequencies of the underlying PCB as this could result in undesirable damage to the underlying electronics. Finally, in step 510, the ultrasonic bonding machine is secured. The frequency can be designed to drop off quite quickly, since the bonding operation should be complete at this point. The total activated time of the ultrasonic bonding machine can be between about 50 and 100 milliseconds.

Figure 6:
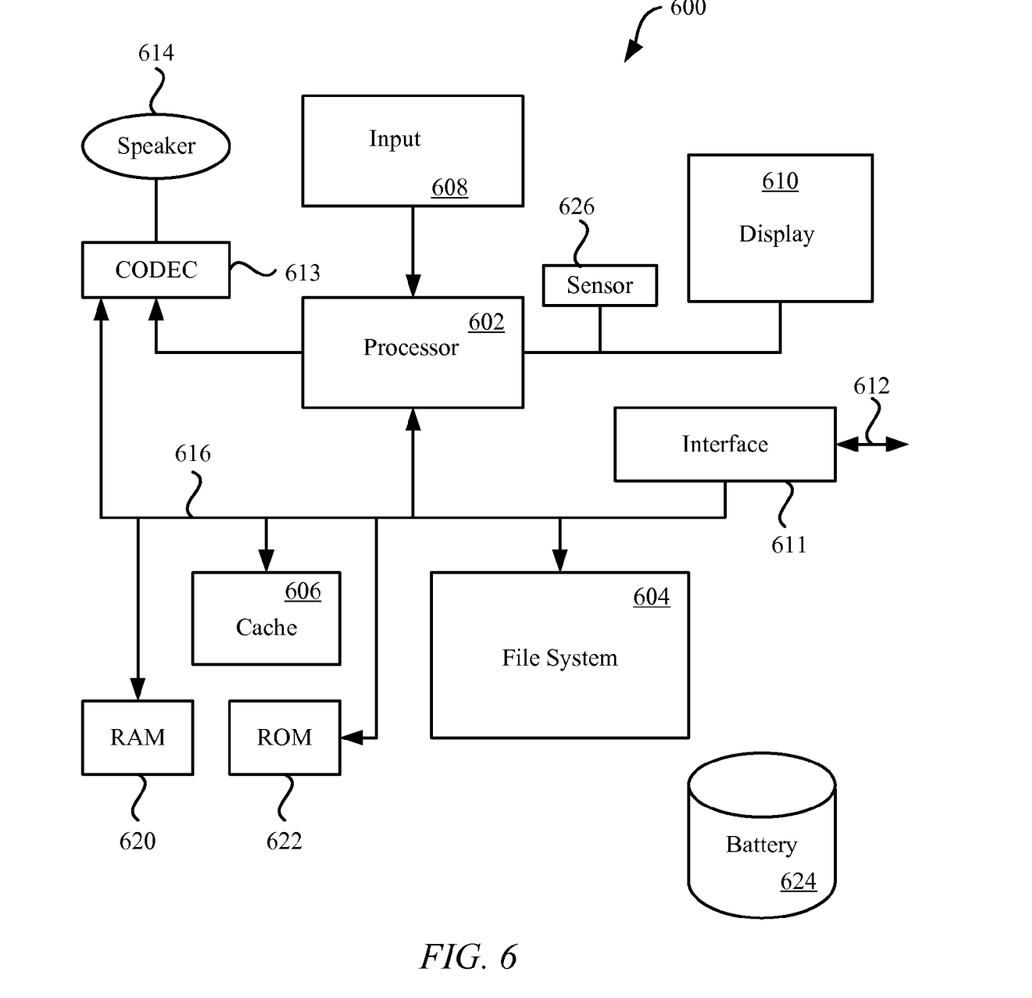
FIG. 6 is a block diagram of an electronic device suitable for use with the described embodiments.

FIG. 6 is a block diagram of electronic device 600 suitable for controlling some of the processes in the described embodiment. Electronic device 600 illustrates circuitry of a representative computing device. Electronic device 600 includes a processor 602 that pertains to a microprocessor or controller for controlling the overall operation of electronic device 600. Electronic device 600 contains instruction data pertaining to manufacturing instructions in a file system 604 and a cache 606. The file system 604 is, typically, a storage disk or a plurality of disks. The file system 604 typically provides high capacity storage capability for the electronic device 600. However, since the access time to the file system 604 is relatively slow, the electronic device 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The power consumption is often a concern when the electronic device 600 is a portable device that is powered by a battery 624. The electronic device 600 can also include a RAM 620 and a Read-Only Memory (ROM) 622. The ROM 622 can store programs, utilities or processes to be executed in a non-volatile manner. The RAM 620 provides volatile data storage, such as for cache 606.

The electronic device 600 also includes a user input device 608 that allows a user of the electronic device 600 to interact with the electronic device 600. For example, the user input device 608 can take a variety of forms, such as a button, keypad, dial, touch screen, audio input interface, visual/image capture input interface, input in the form of sensor data, etc. Still further, the electronic device 600 includes a display 610 (screen display) that can be controlled by the processor 602 to display information to the user. A data bus 616 can facilitate data transfer between at least the file system 604, the cache 606, the processor 602, and a coder/decoder (CODEC) 613. The CODEC 613 can be used to decode and play a plurality of media items from file system 604 that can correspond to certain activities taking place during a particular manufacturing process. The processor 602, upon a certain manufacturing event occurring, supplies the media data (e.g., audio file) for the particular media item to the CODEC 613. The CODEC 613 then produces analog output signals for a speaker 614. The speaker 614 can be a speaker internal to the electronic device 600 or external to the electronic device 650. For example, headphones or earphones that connect to the electronic device 600 would be considered an external speaker.

The electronic device 600 also includes a network/bus interface 611 that couples to a data link 662. The data link 612 allows the electronic device 600 to couple to a host computer or to accessory devices. The data link 612 can be provided over a wired connection or a wireless connection. In the case of a wireless connection, the network/bus interface 611 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 626 can take the form of circuitry for detecting any number of stimuli. For example, sensor 626 can include any number of sensors for monitoring a manufacturing operation, such as for example, a vision system configured to track the progress of a bonding operation, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for bonding a plurality of wires to a printed circuit board (PCB) pad without solder, the method comprising:
    arranging a plurality of wires together on the PCB pad;
    placing a conformal cavity of an ultrasonic bonding horn over a portion of each of the plurality of wires wherein the conformal cavity and the PCB pad cooperate to restrict movement of the plurality of wires; and
    actuating the ultrasonic bonding horn, wherein the actuation of the ultrasonic bonding horn causes a metal-to-metal bond to be formed between each of the plurality of wires and the PCB pad such that each of the plurality of wires is in direct contact with the PCB pad.

2. The method as recited in claim 1, wherein a bottom surface of the ultrasonic bonding horn is not in direct contact with a top surface of the PCB pad when the conformal cavity of the ultrasonic bonding horn is placed over the plurality of wires.

3. The method as recited in claim 2, wherein the conformal cavity of the ultrasonic bonding horn is placed such that a vibratory axis of the ultrasonic bonding horn is aligned with a long dimension of the PCB pad.

4. The method as recited in claim 3, wherein the ultrasonic bonding horn is actuated at a frequency that does not coincide with a resonant frequency of the PCB pad.

5. The method as recited in claim 3, wherein the vibratory axis of the ultrasonic bonding horn is aligned parallel with respect to the plurality of wires.

6. The method as recited in claim 1, wherein arranging the plurality of wires together on the PCB pad comprises arranging the plurality of wires in a tight bundle on the PCB pad, the tight bundle having a size in accordance with the conformal cavity.

7. The method as recited in claim 6, wherein displacement of the ultrasonic bonding horn during the bonding operation is limited to about 10 microns.

8. The method as recited in claim 7, wherein each of the plurality of wires has a diameter of at least seven microns.

9. A non-transitory computer readable storage medium configured to store instructions that when executed by a processor of a computer aided manufacturing system for bonding a plurality of wires to a metal substrate without solder cause the computer aided manufacturing system to perform the following:
    place a cavity of an ultrasonic bonding horn over an end portion of each of the plurality of wires, wherein the cavity and the metal substrate cooperate to restrict movement of the plurality of wires; and
    actuate the ultrasonic bonding horn, wherein the actuation of the ultrasonic bonding horn causes a bond to be formed between each of the plurality of wires and the metal substrate such that each of the plurality of wires is in direct contact with the metal substrate.

10. The non-transitory computer readable storage medium as recited in claim 9, wherein placing the cavity over the plurality of wires comprises aligning a vibratory axis of the ultrasonic bonding horn with a long axis of the metal substrate.

11. The non-transitory computer readable storage medium as recited in claim 9, wherein the ultrasonic bonding horn is actuated at a frequency of between about 60 and 80 kHz for a period of between about 50 and 100 milliseconds.

12. The non-transitory computer readable storage medium as recited in claim 9, further comprising instructions that cause the computer aided manufacturing system to squeeze the plurality of wires together prior to placing the cavity of the ultrasonic bonding horn over the end portion of each of the plurality of wires.

13. The method as recited in claim 1, wherein the ultrasonic bonding horn is actuated at a frequency of between about 60 and 80 kHz for a period of between about 50 and 100 milliseconds.

14. The method as recited in claim 13, wherein the PCB pad is coupled to a PCB and wherein actuating the ultrasonic bonding horn for the period of time between about 50 and 100 milliseconds does not decouple the PCB pad from the PCB.

15. A method for bonding a plurality of wires to a metal substrate without solder, the method comprising:
  arranging a plurality of wires together on the metal substrate;
  aligning a cavity of an ultrasonic bonding horn with the metal substrate such that the cavity is over an end portion of each of the plurality of wires arranged on the metal substrate; and
  actuating the ultrasonic bonding horn to cause each of the plurality of wires to be bonded directly to the metal substrate.

16. The method as recited in claim 15, wherein the ultrasonic bonding horn is actuated at a frequency of between about 60 and 80 kHz for a period of between about 50 and 100 milliseconds.

17. The method as recited in claim 15, wherein the metal substrate is coupled to a printed circuit board (PCB) and wherein actuating the ultrasonic bonding horn for the period of time between about 50 and 100 milliseconds does not decouple the metal substrate from the PCB.

* * * * *